US008568025B2

(12) United States Patent
Meilleur et al.

(10) Patent No.: US 8,568,025 B2
(45) Date of Patent: Oct. 29, 2013

(54) FIBER OPTIC TEMPERATURE PROBE FOR OIL-FILLED POWER TRANSFORMERS

(76) Inventors: Jean-François Meilleur, Saint-Jean-Chrysostome (CA); Jean-Noël Bérubé, Saint-Augustin-de-Desmaures (CA); Michel Plourde, Québec (CA)

( * ) Notice: Subject to any disclaimer, the term of this patent is extended or adjusted under 35 U.S.C. 154(b) by 434 days.

(21) Appl. No.: 12/253,677

(22) Filed: Oct. 17, 2008

(65) Prior Publication Data

US 2009/0213898 A1 Aug. 27, 2009

Related U.S. Application Data

(63) Continuation of application No. 11/354,292, filed on Feb. 14, 2006, now abandoned.

(60) Provisional application No. 60/651,980, filed on Feb. 14, 2005.

(51) Int. Cl.
*G01K 1/02* (2006.01)
*G01K 1/14* (2006.01)
*G01K 1/16* (2006.01)
*G01J 5/08* (2006.01)

(52) U.S. Cl.
USPC .......... 374/152; 374/130; 374/144; 374/161; 374/208; 356/43

(58) Field of Classification Search
USPC .......................................... 356/43
See application file for complete search history.

(56) References Cited

U.S. PATENT DOCUMENTS

| 3,960,017 | A | * | 6/1976 | Romanowski | 374/152 |
|---|---|---|---|---|---|
| 4,092,864 | A | * | 6/1978 | Romanowski | 374/152 |
| 4,307,607 | A | * | 12/1981 | Saaski et al. | 374/161 |
| 4,515,474 | A | * | 5/1985 | Fox | 356/44 |
| 4,669,872 | A | * | 6/1987 | Ida | 356/43 |
| 4,733,933 | A | * | 3/1988 | Pikulski | 385/12 |
| 4,789,992 | A | | 12/1988 | Wickersheim et al. | |
| 4,868,381 | A | * | 9/1989 | Davis | 250/227.27 |
| 4,997,286 | A | | 3/1991 | Fehrenbach et al. | |
| 5,078,507 | A | * | 1/1992 | Koller | 374/159 |
| 5,110,216 | A | | 5/1992 | Wickersheim et al. | |
| 5,146,244 | A | * | 9/1992 | Myhre et al. | 359/509 |
| 5,255,980 | A | | 10/1993 | Thomas et al. | |
| 5,364,186 | A | | 11/1994 | Wang et al. | |
| 5,594,819 | A | * | 1/1997 | Narendran et al. | 385/12 |
| 5,681,277 | A | * | 10/1997 | Edwards et al. | 604/22 |

(Continued)

FOREIGN PATENT DOCUMENTS

| JP | 63008527 A | * | 1/1988 |
| JP | 03161911 A | * | 7/1991 |
| JP | 2000283882 A | * | 10/2000 |
| JP | 2001050855 A | * | 2/2001 |

*Primary Examiner* — Gail Verbitsky

(57) ABSTRACT

A temperature probe for use in oil-filled transformers comprises an optical fiber, a temperature sensitive member, and a protective cylindrical sheath. The optical fiber and the sensitive member are located in the protective sheath, and continuous longitudinal slit is defined along the length of the sheath to allow oil to flow therein. The optical fiber is mounted in and to the sheath using a bonding material and at a distance from the sheath. The sensitive member is adhesively mounted to the optical fiber, within the sheath, and at a distance thereof.

7 Claims, 2 Drawing Sheets

(56) References Cited

U.S. PATENT DOCUMENTS

| | | | |
|---|---|---|---|
| 5,936,715 A * | 8/1999 | Shapanus et al. | 356/70 |
| 5,993,074 A * | 11/1999 | Chambers et al. | 385/90 |
| 6,086,250 A | 7/2000 | Rouhet et al. | |
| 6,215,927 B1 * | 4/2001 | Singh | 385/37 |
| 6,511,222 B1 | 1/2003 | Bouamra | |
| 6,527,441 B1 * | 3/2003 | Cranch et al. | 374/161 |
| 6,842,234 B2 * | 1/2005 | Kong et al. | 356/70 |
| 8,170,382 B2 * | 5/2012 | Galarneau et al. | 385/12 |
| 8,297,835 B2 * | 10/2012 | Girbig et al. | 374/130 |
| 2001/0022804 A1 * | 9/2001 | Helmig et al. | 374/161 |
| 2002/0141701 A1 * | 10/2002 | Boitel et al. | 385/37 |
| 2002/0186748 A1 | 12/2002 | Yates et al. | |
| 2004/0206893 A1 * | 10/2004 | Sato | 250/227.14 |
| 2004/0264831 A1 * | 12/2004 | Leppert | 385/12 |
| 2007/0171958 A1 * | 7/2007 | Hoang et al. | 374/161 |
| 2010/0116318 A1 * | 5/2010 | Sumida et al. | 136/246 |
| 2010/0296771 A1 * | 11/2010 | Weynant et al. | 385/13 |
| 2012/0247204 A1 * | 10/2012 | Herz et al. | 73/431 |

\* cited by examiner

FIBER OPTIC TEMPERATURE PROBE FOR OIL-FILLED POWER TRANSFORMERS

CROSS REFERENCE TO RELATED APPLICATIONS

This application is a continuation of and claims priority on U.S. Utility patent application Ser. No. 11/354,292 filed Feb. 14, 2006, currently pending, which claims priority on U.S. Provisional Patent Application No. 60/651,980 filed on Feb. 14, 2005, which are herein incorporated by reference.

FIELD OF THE INVENTION

The present invention relates to temperature probes for oil-filled power transformers and, more particularly, to fiber optic temperature probes.

BACKGROUND OF THE INVENTION

Temperature probes are used in many applications, including in oil-filled power transformers. Such temperature probes can have an optical fiber extending within a sheath, and with a spiral wrap. The temperature sensitive element is generally held in position on the outside of the sheath with an epoxy bubble. Diagonal or perpendicular slits are defined in the sheath.

There is a need to provide a fiber optic temperature probe that allows the oil to flow properly into the sheath so as to reach the optical fiber.

There is also a need to provide a fiber optic temperature probe wherein stress is reduced on the temperature sensitive element.

The present invention seeks to meet this and other needs.

SUMMARY OF THE INVENTION

The present invention relates to a fiber optic temperature probe that aims at overcoming the drawbacks of known fiber optic temperature probes.

It is therefore an aim of the present invent into provide a novel fiber optic temperature probe, typically for use in oil-filled power transformers.

Therefore, in accordance with the present invention, there is provided a temperature probe, typically for use in oil-filled transformers, comprising an optical fiber, a temperature sensitive member, and a protective sheath, the optical fiber and the sensitive member being located in the protective sheath, the sheath defining at least one substantially longitudinal slit so as to allow oil to flow into the sheath.

Also in accordance with the present invention, there is provided a temperature probe, typically for use in oil-filled transformers, comprising an optical fiber, a temperature sensitive member, and a protective sheath, the optical fiber and the sensitive member being located in the protective sheath.

Further in accordance with the present invention, there is provided a temperature probe, typically for use in oil-filled transformers, comprising an optical fiber, a temperature sensitive member, and a protective sheath, the sensitive member being mounted to the optical fiber and the optical fiber being mounted to the protective sheath.

Having described the invention generally, illustrative embodiments of the fiber optic temperature probe of the present invention will be described hereinbelow together with the drawings. The illustrative embodiments should not be construed as a limitation of the present invention but only as exemplified and non-limiting embodiments.

BRIEF DESCRIPTION OF THE DRAWINGS

Reference will now be made to the accompanying drawings, showing by way of illustration an illustrative embodiment of the present invention, and in which.

DESCRIPTION OF ILLUSTRATIVE EMBODIMENTS OF THE INVENTION

The present invention is illustrated in further details by the following non-limiting examples.

In accordance with the present invention, there is herein illustrated a fiber optic temperature probe P, which is typically used in oil-filled power transformers.

Figure 2:
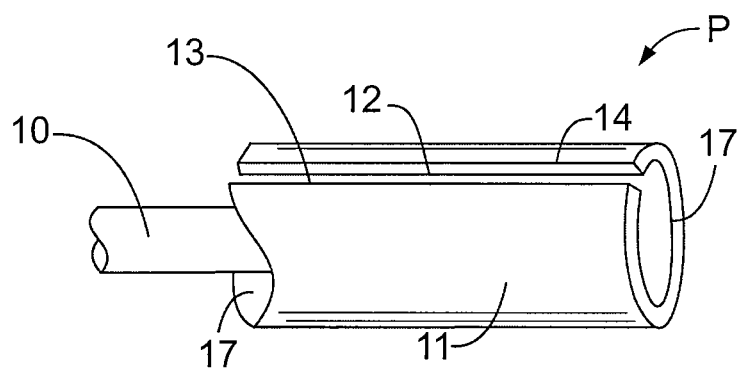
FIG. 2 is a perspective view of the fiber optic temperature probe of FIG. 1, with proximal parts of a sheath tube and of an optical cable of the temperature probe being fragmented for illustration purposes.
Figure 3:
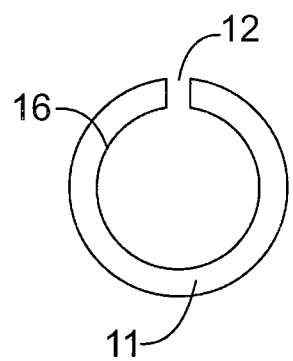
FIG. 3 is a diametrical cross-sectional view of a sheath tube of the fiber optic temperature probe of FIGS. 1 and 2, the sheath tube protecting an optical cable of the temperature probe and defining herein a continuous slit; and, FIG. 4 is side elevational view of the fiber optic temperature probe of the present invention.

The temperature probe P includes an optical fiber 10 that extends longitudinally within an outer protective sheath tube 11. The sheath tube 11 defines slit, herein illustratively shown as a continuous slit 12, that is a slit that extends the whole length of the sheath tube 11. The continuous slit 12, which is well shown in FIGS. 2 and 3, allows dielectric oil contained in the power transformer to reach the inside of the temperature probe P.

A bonding material 13 is provided inside the sheath tube 11 to mount the optical fiber 10 to the inside surface of the sheath tube 11. The bonding material 13 herein has an annular configuration to surround the optical fiber 10 and ensure its position inside the sheath tube 11. The bonding material 13 can be epoxy, a silicone adhesive, a polymer, a fluoropolymer, and any other suitable bonding or mounting material.

The sheath tube 11 has a chemically-etched or mechanically-modified inner circumferential area 16 for improved bonding of the bonding material 13 to the inside surface of the sheath tube 11. This is particularly desirable when the protective sheath tube 11 is made out of a hard to bond material, such as fluoropolymers including PTFE (polytetrafluoroethylene), FEP (fluorinated ethylene-propylene) and PFA (phenol-formaldehyde adhesive).

Figure 1:
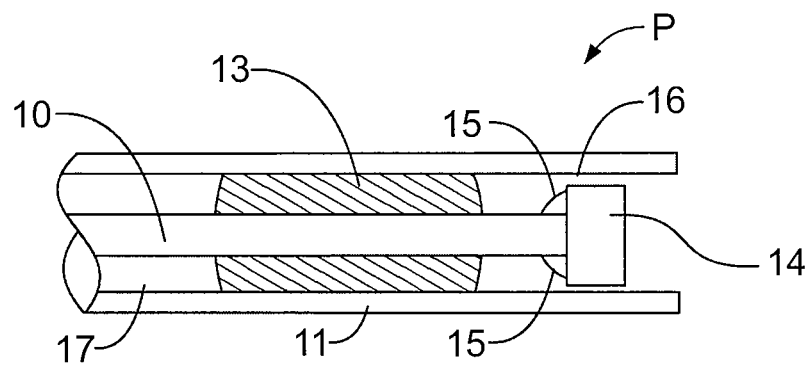
FIG. 1 is a longitudinal cross-sectional view of part of a fiber optic temperature probe in accordance with an illustrative embodiment of the present invention.

The chemically-etched or mechanically-modified area 16 is of variable length depending on the location needed for the bonding of the optical fiber 10. The chemically-etched or mechanically-modified area 16 is located substantially at the tip of the sheath tube 11, as shown in FIG. 1, and can proximally start at the beginning of the sheath tube 11, or not.

The fiber optic temperature probe P also includes a temperature-sensitive element 14 that induces a change of optical properties according to a given temperature. A light signal is sent is to the temperature-sensitive element 14 through the optical fiber 10. The light that is returned from the temperature-sensitive element 14 carries changes of characteristics, such as, but not limited to, wavelength, intensity or interferences. The temperature probe mates with an optical signal conditioner which decodes such a new light profile and converts it into engineering units.

The temperature-sensitive element 14 can take on various geometrical forms (e.g. disc, square, tubular, octagonal, etc.). The temperature-sensitive element 14 is bonded, as seen in FIG. 1, to the distal end of the optical fiber 10 using an appropriate adhesive 15. The temperature-sensitive element 14 is then bonded to the sheath tube 11 with epoxy, silicone adhesives or fluoropolymers at the location of the chemically-etched or mechanically-modified area 16 of the sheath tube 11.

The sheath tube 11 can have an outer dimension, herein outer diameter, ranging, for instance, between 0.3 mm and 10 mm. The sheath tube 11 can be made of polymers plastics and, as previously mentioned, fluoropolymers such as PTFE, FEP, PFA, Hydrel™, Tefzel™, polyimide and similar materials. The sheath tube 11 can be of any color or opacity. When the sheath tube 11 is made out of PTFE fluoropolymers (Teflon™) materials, temperature probe design and construction allow for the use of temperature probes at service temperatures of up to 260° C.

Figure 4:
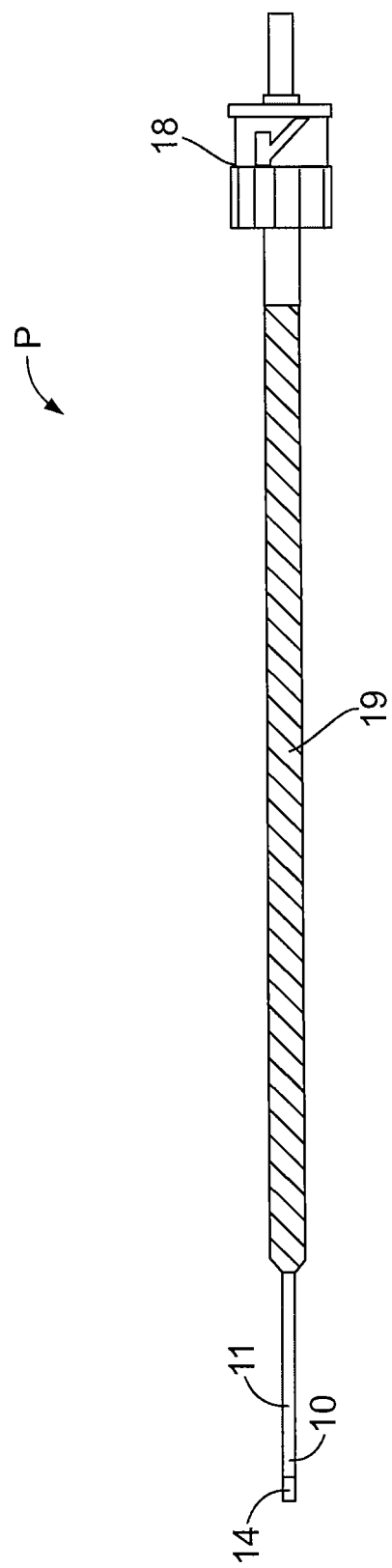

The fiber optic cable 10 can be of any size, type (monomode or multimode) and material. An optical connector 18 (shown in FIG. 4) is attached to a proximal end of the optical fiber 10 and sheath tube 11, i.e. the end opposite to the distal end shown in FIGS. 1 and 2 and that houses the temperature sensitive element 14. Proximally of the sheath tube 11 shown generally in FIGS. 1 and 2, the temperature probe P has a reinforcement spiral wrap 19 (shown in FIG. 4) that, for instance, is made of PTFE Teflon™ and has a diameter of 3.1 mm.

The fiber optic temperature probe P can be as long as it is possible to manufacture the sheath tube 11 with its continuous longitudinal slit 12. It is also possible to use a sheath tube that has multiple longitudinal sections instead of one continuous longitudinal slit 12. The continuous longitudinal slit 12 allows for the flow of dielectric oil into the temperature probe P, thus filling void gaps 17 defined within the sheath tube 11.

From the foregoing, the probe P of the present invention, compared with existing fiber optic temperature probes for oil-filled transformers, provides a more robust, a more oil permeable sheath as well as a more economical design. This results from the sheath tube 11 provided over the optical fiber 10 and that defines the continuous slit 12 along the whole length of the tube wall and by bonding the optical fiber 10, instead of the sensitive element 14, to the sheath tube 11. Furthermore, the temperature sensitive element 14 is located inside the sheath tube 11, as opposed to being, as in known probes, located exteriorly of the sheathing tube, thereby providing a more robust design.

Fiber optic temperature probes, to be compatible with high voltage environmental conditions present inside a power transformer, must be free of any air gaps or foreign particulates. This sensor is usually attached to the inner parts of the transformer, such as bushings, windings, oil conduits, radiator, top/bottom of tank, etc. The present probe P allows for a substantially optimal flow of the dielectric oil into the whole probe P.

Compared to known fiber optic temperature probes, the present probe P has the following characteristics. The probe P has the protective sheath tube 11 over the optical fiber 10 with the continuous longitudinal slit 12 that allows oil to migrate into the sheath 11. The sensitive element 14 is free inside the sheath tube 11, with no bonding that can cause stress or deformation (mechanical or optical) of the sensitive element 14. The optical fiber 10 is bonded to the protective sheath tube 11 near the optically sensitive element 14 with high temperature epoxy, silicon or fluoropolymers. The protective sheath 11 is chemically-etched (or mechanically-modified) on its inner wall before receiving the bonding adhesive 13. The present probe P is easier and more economical to manufacture because the sheath tube 11 is already slit on its entire length, thereby avoiding the additional operation for allowing the oil to access the inside of the sheath such as diagonal or perpendicular slits as in known probes.

Aside from the above characteristics, the probe P can be manufactured in considerable lengths without breakage (e.g. up to 25 meters), as there are no mechanical operations to effect on the sheath tube 11, such as the operation of defining perpendicular slits in known probes. Also, the present simpler design requires less manipulation, such as the sensitive element 14 that is simply manufactured by simply bonding the optical fiber 10 to the sheath tube 11. Furthermore, the present probe P provides a robust protective sheath design as there is no mechanical degradation of the protective sheath tube 11 such as seen with known sheathings having multiple diagonal or perpendicular slits and where these slits may degrade the sheath's ability to protect the optical fiber during transformer manufacturing. Moreover, the present probe P provides a robust sensitive element 14 as, since the sensitive element 14 is embedded inside the sheath tube 11, which is an enclosed sensitive tip, there is no risk of the sensitive element 14 becoming detached during manipulation and installation (in known methods involving external bonding, there is created a protuberance around the sensitive element, which may act as a handle or grip that can thus allow force to detach such sensitive element).

The present invention can take on various other configurations, and examples thereof follow hereinbelow.

The longitudinal slit 12 can, as previously mentioned, be in multiple sections instead of being continuous. The location of these longitudinal slit sections can be anywhere on the circumference of the sheath tube 11.

Different materials, sizes and interconnections can be used for the components.

It is possible not to use the chemically-etched or mechanically-modified inner circumferential area 16 on the entire interior surface of the sheath tube 11 if the material used for the sheath tube 11 is reputed to be easy to bond.

The bonding material 13 used to attach the optical fiber 10 to the sheath tube 11 can also cover completely the sensitive element 14.

There can be multiple chemically-etched or mechanically-modified inner circumferential areas 16 provided at more than one location along the sheath tube 11.

A chemically-etched or mechanically-modified inner circumferential area 16 can also be provided on the exterior surface of the sheath tube 11.

Although the present invention has been described hereinabove by way of specific embodiments thereof, it may be modified, without departing from the spirit and nature of the subject invention as defined in the appended claims.

We claim:

1. A temperature probe for use in fluid-filled transformers, comprising an optical fiber, a temperature sensitive member mounted to the optical fiber, and a protective sheath, the optical fiber and the sensitive member being located in the protective sheath, the sheath defining at least one substantially longitudinal slit so as to allow the fluid to flow into the sheath, wherein the sensitive member is mounted to the optical fiber with an adhesive.

2. A temperature probe as defined in claim 1, wherein the sheath is tubular.

3. A temperature probe as defined in claim 1, wherein the slit is a single continuous slit.

4. A temperature probe as defined in claim 3, wherein the continuous slit extends substantially a length of the protective sheath.

5. A temperature probe as defined in claim 1, wherein the optical fiber is mounted in the sheath using a bonding material.

6. A temperature probe as defined in claim 5, wherein the optical fiber is mounted with the bonding material at a distance from the sheath.

7. A temperature probe as defined in claim 1, wherein the sensitive member is mounted substantially at a distal end of the optical fiber and at a distance from the sheath.

* * * * *